F. H. BURGON.
HEATING STOVE.
APPLICATION FILED DEC. 24, 1919.

1,333,291.

Patented Mar. 9, 1920.
6 SHEETS—SHEET 1.

INVENTOR:
BY Frederick H. Burgon
Wm Wallace White
ATTY.

F. H. BURGON.
HEATING STOVE.
APPLICATION FILED DEC. 24, 1919.

1,333,291.

Patented Mar. 9, 1920.
6 SHEETS—SHEET 6.

INVENTOR:
Frederick H. Burgon
BY Wm Wallace White
ATT'Y.

UNITED STATES PATENT OFFICE.

FREDERICK H. BURGON, OF SHEFFIELD, ENGLAND.

HEATING-STOVE.

1,333,291.  Specification of Letters Patent.  Patented Mar. 9, 1920.

Application filed December 24, 1919. Serial No. 347,159.

*To all whom it may concern:*

Be it known that I, FREDERICK HARRY BURGON, a subject of the King of Great Britain and Ireland, residing at 13 Coverdale road, Sheffield, county of York, England, have invented certain new and useful Improvements in Heating-Stoves, of which the following is a specification, reference being had to the accompanying drawings.

This invention relates to heating stoves and has for its object to provide an improved stove enabling a high heating efficiency to be obtained with a low consumption of fuel and heat to remain stored in the stove for a considerable period after the fire has become low or is extinguished.

The invention consists in the improved heating stove of the kind referred to provided with a heat storage dome or the like adapted to absorb and store heat from the hot gasses passing therethrough and afterwards to radiate the stored heat.

Figure 1:
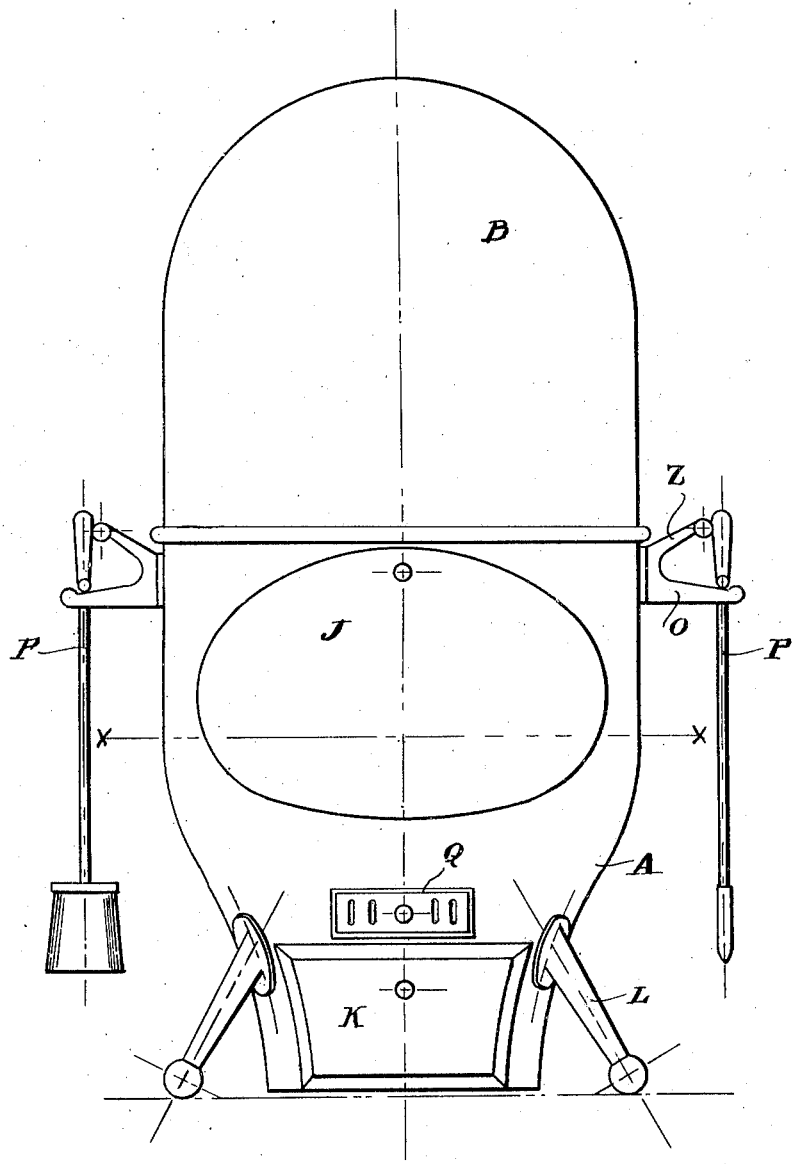
Figure 2:
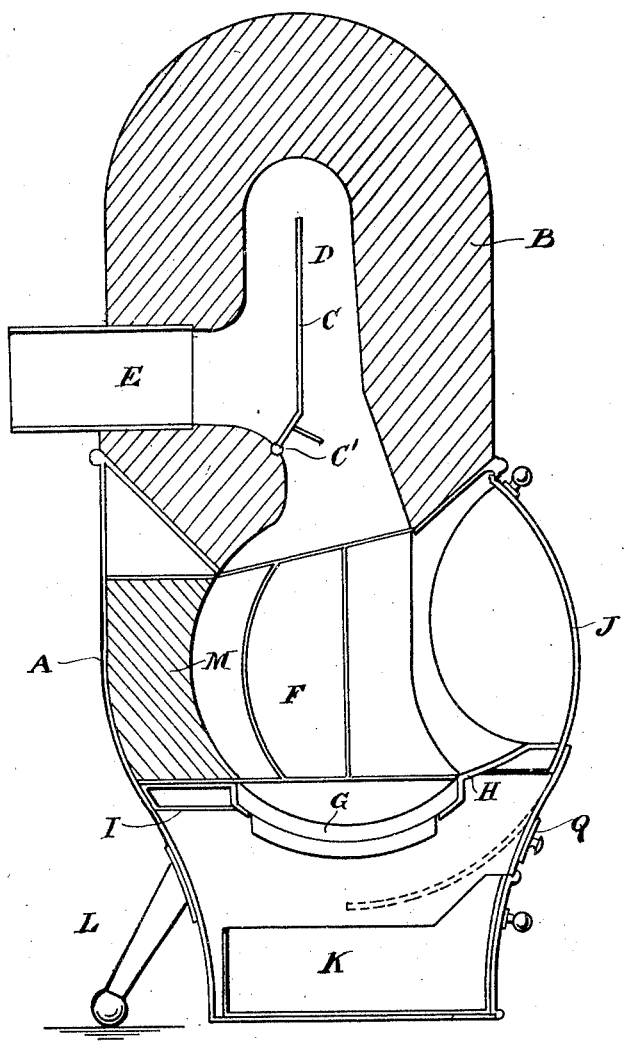
Figure 3:
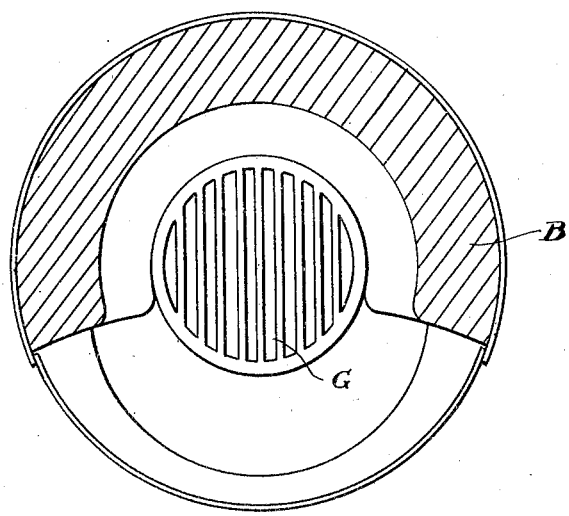
Figure 4:
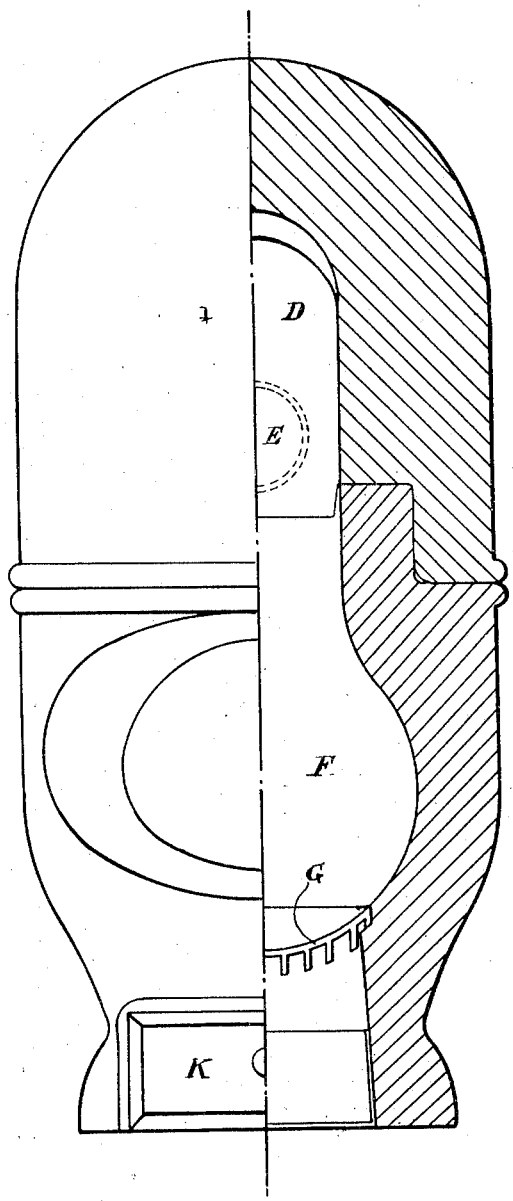
Figure 5:
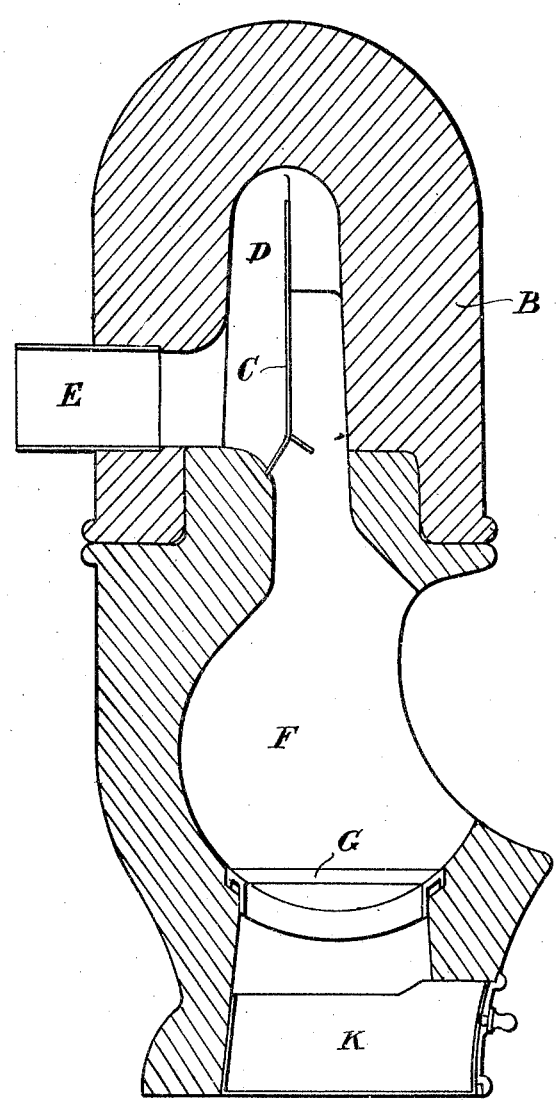
Figure 6:
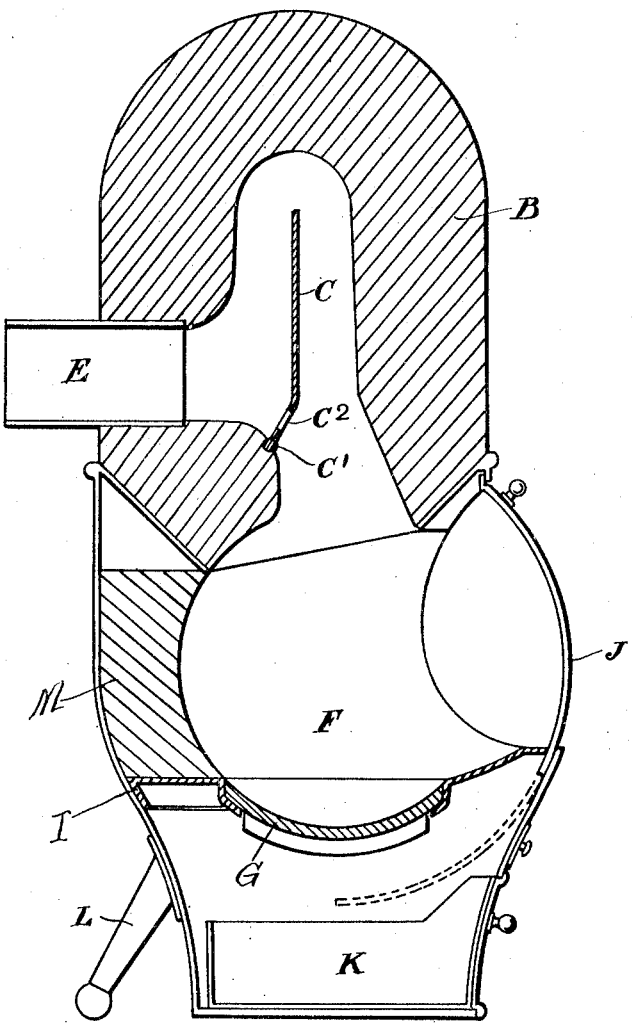
Figure 7:
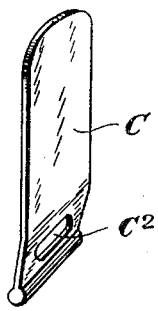

In order that the nature of the invention may be clearly understood a suitable construction of the improved stove which has given good results will now be described with the aid of the accompanying drawings in which Figure 1 is a front elevation of a heating stove constructed in accordance with this invention, Fig. 2 is a side sectional view of Fig. 1, Fig. 3 is a cross-sectional view of Fig. 1, on the line $x-x$, Fig. 4 is a front elevation, half in section, of a modified form of heating stove, and Fig. 5 is a side sectional view of Fig. 4, Fig. 6 is a side sectional elevation of stove showing baffle with by-pass and Fig. 7 is a perspective view of the baffle showing the by-pass.

Referring to the drawings which illustrate the preferred form, the metal body A of the stove is of a more or less cylindrical form and is supported upon feet L. Alternatively the stove may be supported by any other desired form of stand and is provided with a curved door or shutter J adapted to entirely close when desired, the fire chamber opening in order to reduce the consumption of fuel and to prevent the passage of cold air over the fire. When the maximum radiation is desired the door J can be fully opened, or it can be left in any intermediate position between the fully open and the closed positions.

In the preferred construction the shutter J is capable of opening either downward, upward or sidewise or partly in one direction and partly in another and may be made as a single shutter or a multiple shutter the parts acting separately or simultaneously, to control the combustion of fuel and the supply of cold air over the top of the fire and serving also as a safety device.

As shown in Fig. 2 the fire chamber F within the metal body A is given a partly curved form and is lined at the back and side with fire-bricks M supported upon a frame I which also carries the fire grate G and the front lip H adjacent to the door J, while beneath the grate G a convenient arrangement is provided to accommodate an ash pan K.

The upper part of the metal body A is provided with a flange upon which is mounted the heat storage dome B made of fire brick or of any other suitable material capable of retaining heat.

The dome or upper section B may be in one piece or block or it may be in sections, and may be reinforced in any desired manner, and may be plain glazed and may be of any desired shape for artistic effect.

In the heat storage dome B a passage D is formed for the products of combustion connecting the fire chamber F with the chimney through an outlet E. The passage D having preferably a more or less oval or elliptical cross-sectional form, is made by providing a hollow recess in the heat storage dome or block B commencing at the base of the latter immediately over the fire chamber F and passing upward to, or rather above the center of the block where a baffle C is secured by means of an enlargement $C^1$ in such a manner as to provide the recess into two passages as clearly shown in Fig. 2 thus compelling the hot products to pass up to the top of the hollow recess over the baffle C and down again to the outlet E and thence to the chimney (not shown).

By the above arrangement the fire-proof dome B is heated by the products of combustion from which it absorbs part of the heat and gives it out again in the form of radiant heat.

In the preferred form the baffle C may be made removable for cleaning purposes and is provided with an aperture $C^2$ which acts as a bypass and more than one baffle may be employed if found desirable.

At each side of the stove a handle Z (Fig. 1) may conveniently be secured by any suitable means and may be formed integral with a bracket O for fire-irons P as shown in Fig. 1. Also an air regulator Q may be arranged to regulate the admission of air beneath the grate G as shown in Figs. 1 and 2.

Various modifications may be made, as will be evident in the details of the construction of the improved heating stove without exceeding the scope of the invention.

I claim:—

1. A heating stove including a lower section having a fire chamber and an upper heat absorbing and radiating refractory section having a vertical recess communicating at its lower end with the fire chamber and extending to a point adjacent the top of the upper section, said upper section also having a horizontal outlet leading into a side of the vertical recess and communicating with the vertical recess between the ends of the latter, and a vertical baffle in the vertical recess extending across the horizontal passage and adjacent to and below the top of the vertical recess and having its lower end secured to said side of the vertical recess into which the outlet leads.

2. A heating stove including a lower section having a fire chamber and an upper section having a vertical recess communicating at its lower end with the fire chamber and extending to a point adjacent the top of the upper section, said upper section also having a horizontal outlet leading into one side of the vertical recess and communicating with the latter between its ends, the lower end of the vertical recess flaring downwardly toward the fire chamber and a verticle baffle in the vertical recess having its lower end disposed at an angle and secured to said side of the vertical recess into which the outlet leads and at a point adjacent the top of the flare of the lower end of the vertical recess, the upper portion of the baffle being arranged midway between the sides of the vertical recess and terminating at its upper end below the top of the vertical recess and extending across the horizontal outlet, the upper section being formed of relatively thick and solid refractory heat absorbing and radiating material.

In witness whereof I have hereunto set my hand in presence of two witnesses.

FRED. H. BURGON.

Witnesses:
WINIFRED OLGA HARTLEY,
MARY MULCAHY.